United States Patent
Uehara et al.

(10) Patent No.: US 6,305,401 B1
(45) Date of Patent: Oct. 23, 2001

(54) PNEUMATIC PRESSURE REGULATOR (75) Inventors: Teruo Uehara, Ibaraki-ken; Takuji Yamada, Misato; Tohru Inohara, Toride; Kazuyuki Oguma, Ibaraki-ken, all of (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/355,346

(22) PCT Filed: Feb. 6, 1997

(86) PCT No.: PCT/JP97/00290

§ 371 Date: Aug. 6, 1999

§ 102(e) Date: Aug. 6, 1999

(87) PCT Pub. No.: WO98/35279

PCT Pub. Date: Aug. 13, 1998

(51) Int. Cl.⁷ .................................................. G05D 16/20
(52) U.S. Cl. ........................................ 137/102; 137/487.5
(58) Field of Search ................................. 137/102, 487.5

(56) References Cited

U.S. PATENT DOCUMENTS

| 4,241,750 | * | 12/1980 | Furuse | 137/102 |
| 4,796,661 | * | 1/1989 | Hishinuma et al. | 137/487.5 |
| 4,901,758 | * | 2/1990 | Cook et al. | 137/487.5 |

FOREIGN PATENT DOCUMENTS

| 40 37 316 | 5/1991 | (DE) . |
| 2 238 924 | 6/1991 | (GB) . |
| 54-76792 | 6/1979 | (JP) . |
| 62-79509 | 4/1987 | (JP) . |
| 62-241013 | 10/1987 | (JP) . |
| 63-7820 | 1/1988 | (JP) . |
| 2-99417 | 8/1990 | (JP) . |
| 3-164912 | 7/1991 | (JP) . |
| 4-52211 | 5/1992 | (JP) . |
| 5-53653 | 3/1993 | (JP) . |
| 7-36551 | 2/1995 | (JP) . |
| 7-50418 | 5/1995 | (JP) . |
| 9-101827 | 4/1997 | (JP) . |

* cited by examiner

Primary Examiner—Stephen M. Hepperle
(74) Attorney, Agent, or Firm—Oblon, Spivak, McClelland, Maier & Neustadt, P.C.

(57) ABSTRACT

The discharge pressure value is made to smoothly approach the predetermined pressure value and once the discharge pressure value reaches the predetermined pressure value, the fluctuation of the discharge pressure value is decreased.

In case the difference C between the discharge pressure value P(B) of the pneumatic regulator and the predetermined pressure value A is relatively large, the solenoid valve 31 is driven by the pulse-width modulation signal D and hence, the rapidity of the input and output response (the variation characteristics of the pressure detection signal B relative to the predetermined pressure signal A) is held, while in case the discharge pressure value P is close to the predetermined pressure value Q, the solenoid valve 31 is driven by the pulse frequency modulation signal J and hence, the amount of excess, a so-called overshoot can be decreased and even after the discharge pressure value P reaches the predetermined pressure value Q, the fluctuation of the discharge pressure value P, namely, the ripple can be decreased.

12 Claims, 6 Drawing Sheets

PNEUMATIC PRESSURE REGULATOR

TECHNICAL FIELD

The present invention relates to a pneumatic regulator which is capable of regulating a flow rate and a pressure of a gas discharged from a main valve by increasing or decreasing a pilot pressure based on the gas supplied to or discharged from a solenoid valve.

BACKGROUND ART

A prior art of a pneumatic regulator for supplying a constant pressure to a pneumatic apparatus is disclosed in Japanese Patent Publication No. 7-50418, for example.

This pneumatic regulator is an apparatus which is constructed such that, at the time of regulating a discharge pressure discharged from a main valve, the pneumatic regulator detects the discharge pressure, compares the detected discharge pressure with a predetermined pressure, and adjusts a pulse-width of a pneumatic pressure pulse supplied to a diaphragm chamber (pilot chamber) from a solenoid valve corresponding to the comparison result, then, a pilot pressure is increased or decreased corresponding to the pulse-width of the pneumatic pulse supplied from the solenoid valve, and an air supply valve body connected to the diaphragm chamber is opened or closed so as to regulate the discharge pressure discharged from the main valve to the predetermined pressure.

In the above-mentioned pneumatic regulator which constitutes the prior art, a drive circuit of the solenoid valve is constructed such that a so-called pulse-width modulation signal in which duty factor varies at a constant frequency is supplied to an electromagnetic coil (exciting coil) of the solenoid valve.

Accordingly, in case the discharge pressure from the main valve is set to a constant value, for example, a feedback control is performed to supply the pulse-width modulation signal to the electromagnetic coil in such a manner that at the time of starting the drive of the solenoid valve, the discharge pressure value is zero and hence, the duty factor of the pulse-width modulation signal is maximum, while the duty factor of the pulse-width modulation signal Is decreased as the discharge pressure value approaches a predetermined pressure value.

However, the inventors have found that in case the electromagnetic coil is driven by the pulse-width modulation signal, the electromagnetic coil is driven for a constant period and hence, in a condition where the discharge pressure value is close to the predetermined value (target value), an amount exceeding the predetermined pressure value (a so-called overshoot) becomes relatively large so that the stability in the vicinity of the predetermined pressure value is deteriorated.

The present invention is made in view of the above problems and it is an object of the present invention to provide a pneumatic regulator which can make the discharge pressure value smoothly approach the predetermined pressure value and can minimize the fluctuation of the discharge pressure value after it reaches the predetermine pressure value.

DISCLOSURE OF THE INVENTION

According to the present invention, in case the discharge pressure value is small relative to the predetermined pressure value, the solenoid valve is driven by the pulse-width modulation signal and hence, the rapidity of an input and output response is held, while in case the discharge pressure value is close to the predetermined pressure value, the solenoid valve is driven by the pulse-frequency modulation signal and hence, the amount of excess can be decreased and the fluctuation of the discharge pressure value after reaching the predetermined pressure value can also be decreased.

Furthermore, according to the present invention, inside of a bonnet integrally connected to an upper portion of a main valve, the solenoid valve, a pressure detection part, a control part and a display part are disposed so that a pneumatic regulator can be made compact or small-sized.

Still furthermore, according to the present invention, a display part which displays pressure values is housed in the bonnet so that a piping and a wiring thereof become unnecessary.

Still furthermore, according to the present invention, an exhaust valve body having a retainer ring is adopted in the construction so that opening and closing of the valve can be surely conducted.

BRIEF DESCRIPTION OF THE DRAWINGS

FIG. 6A to FIG. 6E are wave-form charts mainly provided for an explanation of operations of an example shown in FIG. 5, wherein

BEST MODE FOR CARRYING OUT THE INVENTION

One embodiment of the present invention is hereinafter explained with reference to drawings.

Figure 1:
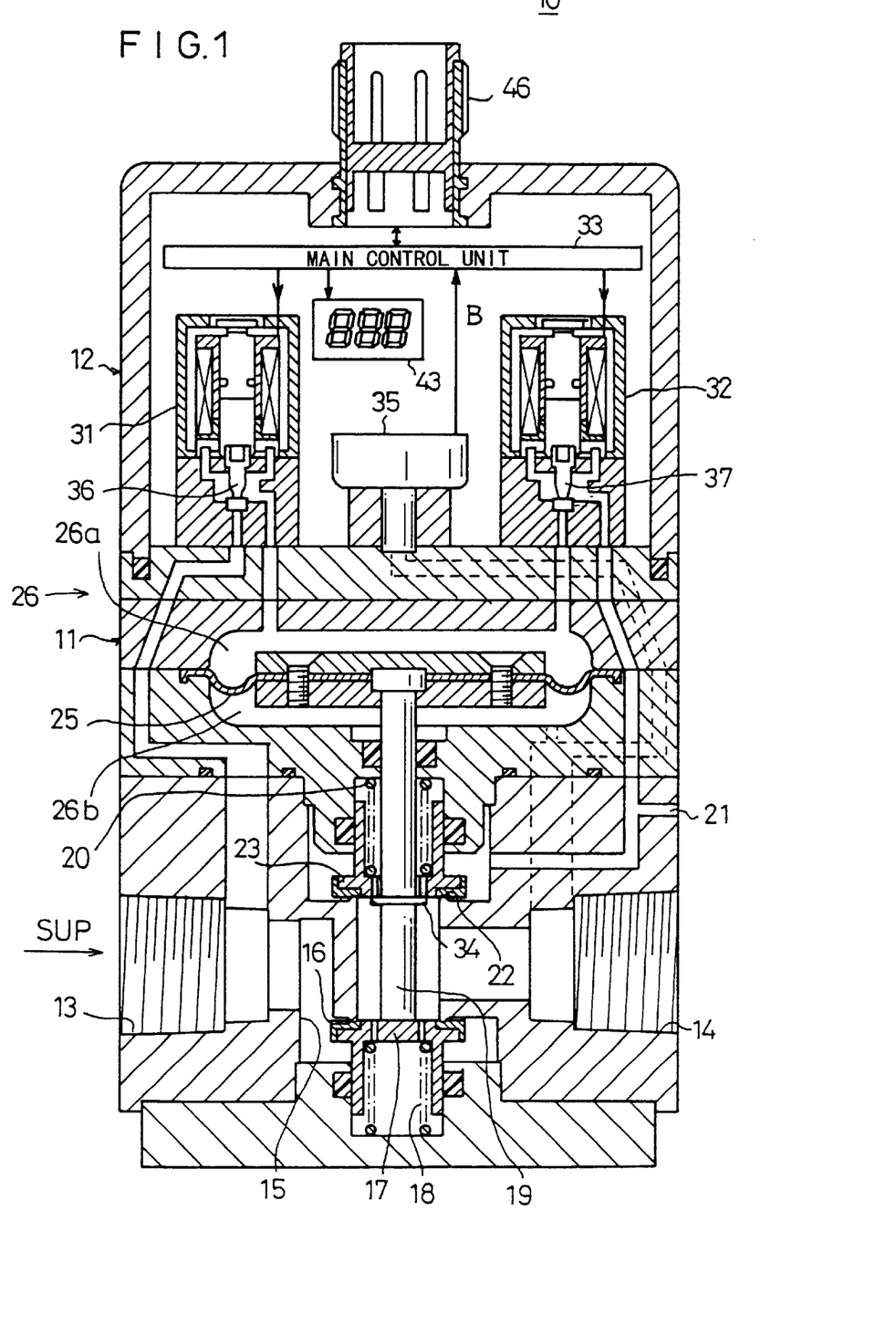
FIG. 1 is a cross-sectional view with a part omitted showing a mechanical construction of one embodiment of the present invention.
Figure 2:
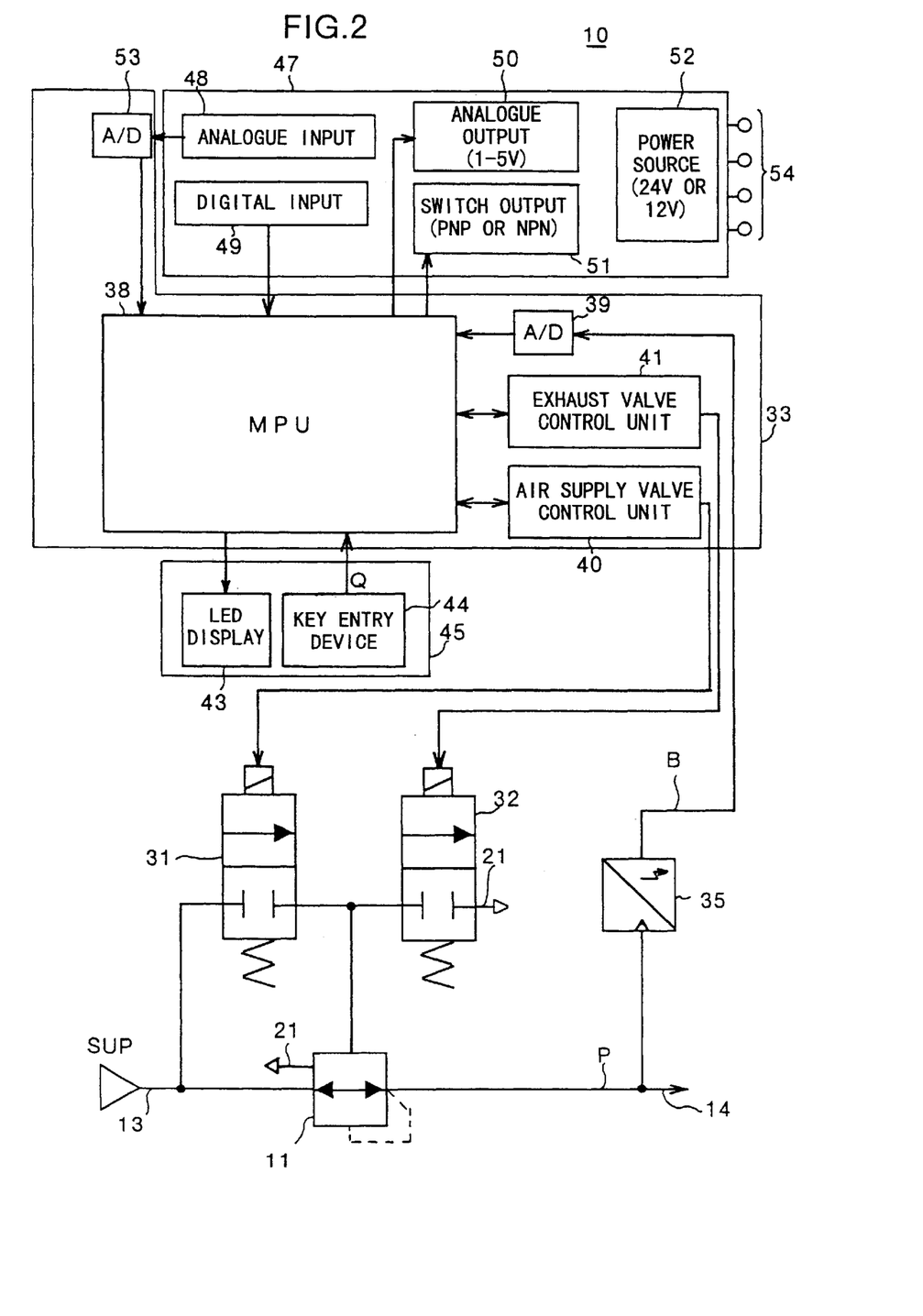
FIG. 2 is a block circuit diagram showing the entire construction of one embodiment of the present invention.

FIG. 1 shows a mechanical construction of a pneumatic regulator 10 to which one embodiment of the present invention is applied. FIG. 2 shows a circuit construction of this pneumatic regulator.

In FIGS. 1 and 2, this pneumatic regulator 10 includes a main valve 11 for performing a pressure control of a pneumatic apparatus (not shown) and a bonnet 12 which is integrally joined with the main valve 11 while covering the main valve 11.

In the main valve 11, a supply port (also referred to as an air supply port) 13 which is connected with a pressurized air source (not shown) and a discharge port 14 which is connected with the pneumatic apparatus (not shown) are formed.

In a passage 15 which connects the supply port 13 and the discharge port 14, an air supply valve body 17 which opens or closes an air supply opening 16 is disposed, and this air supply valve body 17 is constantly biased in a direction to close the air supply opening 16 with a compression force of a spring 18.

In the main valve 11, an exhaust port 21 is formed and in an exhaust opening 22 which makes this exhaust port 21 communicate with the discharge port 14, an exhaust valve body 23 which opens or closes the exhaust opening 22 is slidably fitted. The exhaust valve body 23 is constantly biased in a direction to close the exhaust opening 22 with a compression force of a spring 20.

At the central portion of the main valve 11, a stem 19 is disposed and the stem 19 has one end thereof coming into contact with the air supply valve body 17. The stem 19 has the other end thereof integrally connected with a diaphragm 25 which is stretched inside of the main valve 11.

A first diaphragm chamber (also referred to as a pilot chamber) 26a and a second diaphragm chamber 26b are defined by the diaphragm 25. The second diaphragm chamber 26b is communicated with the discharge port 14. The first diaphragm chamber 26a and the second diaphragm chamber 26b are combined to constitute a diaphragm chamber 26.

When the pressure (the pilot pressure) inside the first diaphragm chamber 26a becomes greater than the pressure inside the second diaphragm 26b, the diaphragm 25 is moved downwardly in the drawing. In this case, the distal end of the stem 19 which is moved downwardly integrally with the diaphragm 25 under a deflecting action of the diaphragm 25 opens the air supply valve body 17 and hence, the pressurized fluid SUP is supplied to the discharge port 14 from supply port 13, by way of the passage 15 and the air supply opening 16 (see FIG. 3).

As shown in FIG. 1, a two-port solenoid valve (simply referred to as a solenoid valve or an air supply valve) 31 which works as a first solenoid valve for supplying a pneumatic pulse which controls the pilot pressure applied to the first diaphragm chamber 26a of the diaphragm 25 and a two-port solenoid valve (simply referred to as a solenoid valve or an exhaust valve) 32 which works as a second solenoid valve for exhausting air are communicated with the first diaphragm chamber 26a.

Figure 3:
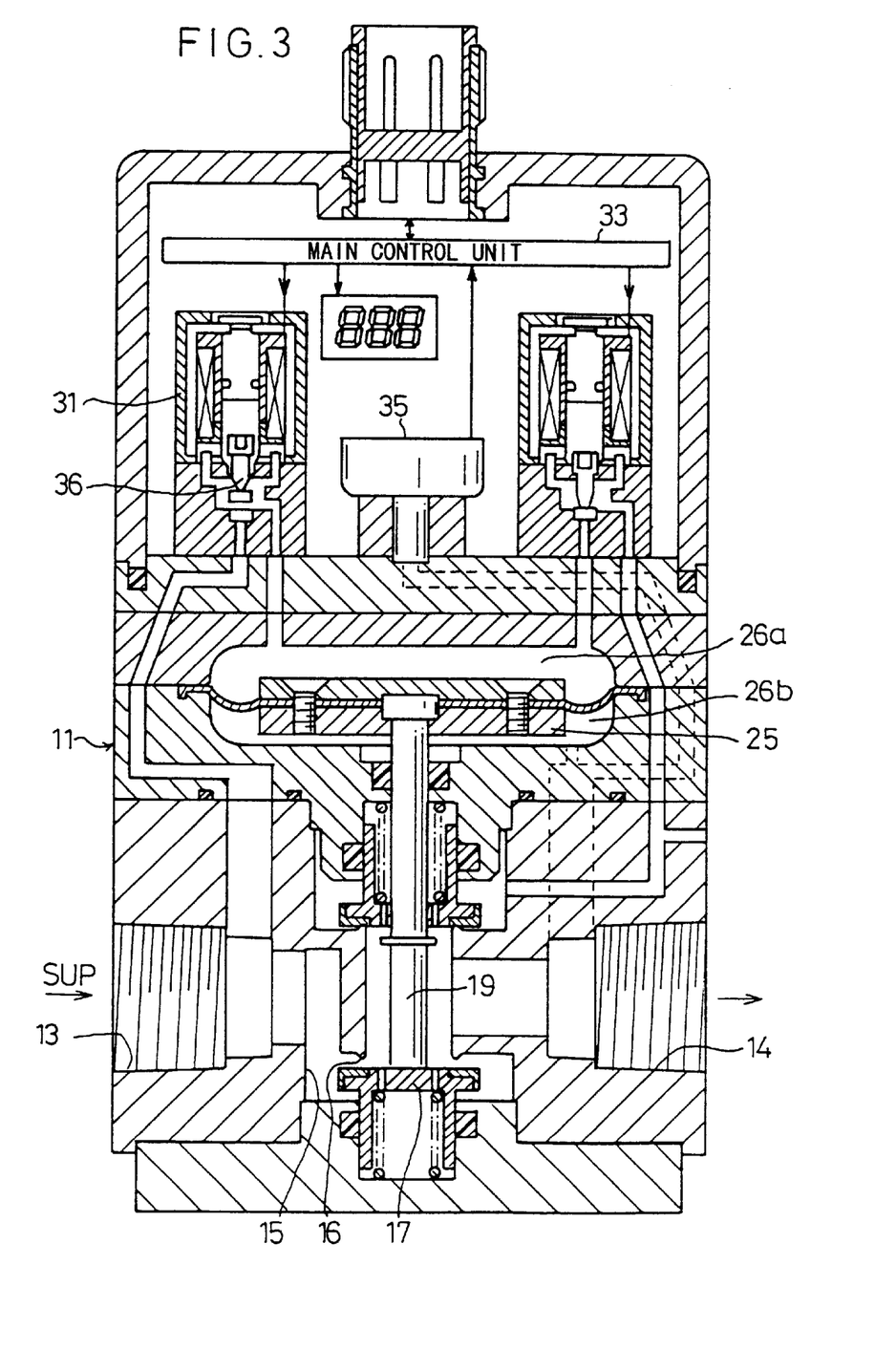
FIG. 3 is a cross-sectional view with a part omitted showing a condition where a supply port and a discharge port are communicated with each other.

In one solenoid valve 31, when an electric current signal is supplied to an electromagnetic coil from a main control unit 33, a valve body 36 is released and the pressurized fluid SUP supplied from the supply port 13 is supplied to the first diaphragm chamber 26a. Accordingly, as shown in FIG. 3, the stem 19 is moved downwardly and the air supply valve body 17 is released. This implies that the solenoid valve 31 works as an air supply valve.

Figure 4:
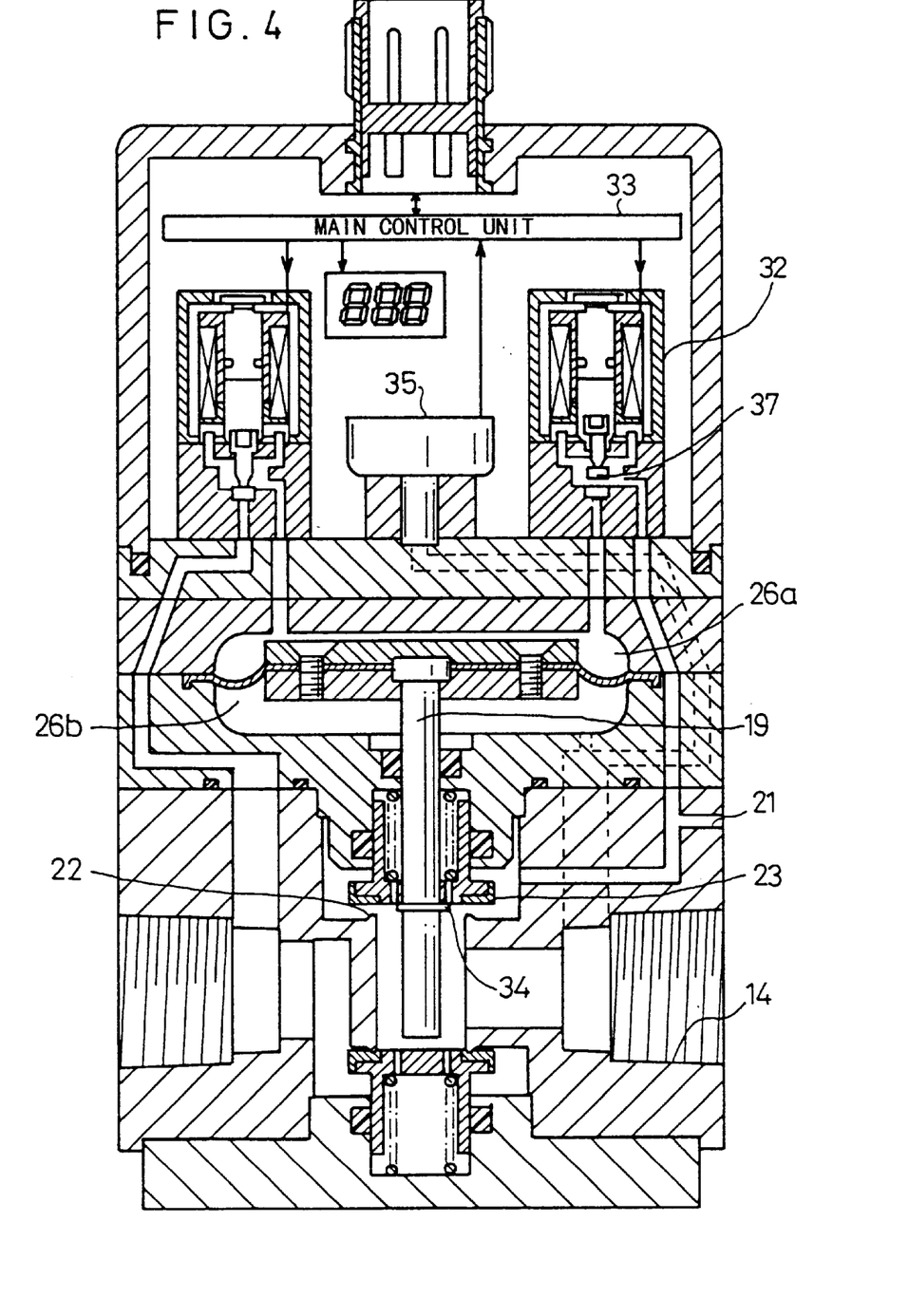
FIG. 4 is a cross-sectional view with a part omitted showing a condition where a discharge port and an exhaust port are communicated with each other.

In the remaining solenoid valve 32, when an electric current signal is supplied from the main control unit 33, the valve body 37 is released and the pressurized fluid in the first diaphragm chamber 26a is discharged to atmosphere by way of the exhaust port 21 and the pressure of the first diaphragm chamber 26a becomes smaller than that of the second diaphragm chamber 26b. Accordingly, the stem 19 is moved upwardly and corresponding to the upward movement of a retainer ring 34 fixedly secured to the midst portion of the stem 19, the exhaust valve body 23 is released and hence, the discharge port 14 is communicated with atmosphere by way of the exhaust opening 22 and the exhaust port 21 (see FIG. 4). This implies that the solenoid valve 32 works as an exhaust valve.

The pressure of the second diaphragm chamber 26b, namely, the discharge pressure P is measured by a pressure sensor 35 which works as pressure detection means (pressure detection part) which communicates with the discharge port 14. The pressure sensor 35 detects the discharge pressure P and converts this to an electric signal (also referred to a pressure detection signal, a discharge pressure signal, or a pressure signal) B and supplies the signal B to the main control unit (control part) 33.

As shown in FIG. 2, the main control unit 33 includes an MPU (microprocessor unit) 38 which works as control means, determination means, processing means, operation means and memory means.

The discharge pressure signal B which is outputted from the pressure sensor 35 is supplied to the MPU 38 as a digital discharge pressure signal B (applied the same reference symbol) by way of an A/D converter 39.

The solenoid valves 31, 32 have their drives respectively controlled by an air supply valve control unit 40 and an exhaust valve control unit 41 and these control units 40, 41 are connected to the MPU 38.

Furthermore, the pressure value or the like which is detected by the discharge pressure signal B is displayed at an LED display (display part) 43. If necessary, a predetermined value Q set by a key entry device 44 may be displayed. Accordingly, the LED display 43 and the key (KEY) entry device 44 work as a so-called user interface 45.

An input and output interface 47 (see FIG. 2) which constitutes an operating panel (not shown) is connected to the MPU 38 by way of a connector 46 (see FIG. 1) attached to an opening portion formed at the upper surface of the bonnet 12. The input and output interface 47 has an analogue input function 48, a digital input function 49, an analogue output function 50 capable of outputting an analogue signal of 1V–5V, a pressure switch output function 51 by PNP, NPN transistors of an open collector and a power source supply function 52 of +12V, 24V. The analogue signal outputted from the analogue input function 48 is supplied to the MPU 38 by way of an A/D converter 53. The input and output interface 47 is connected with an external apparatus by way of a group of terminals 54.

Figure 5:
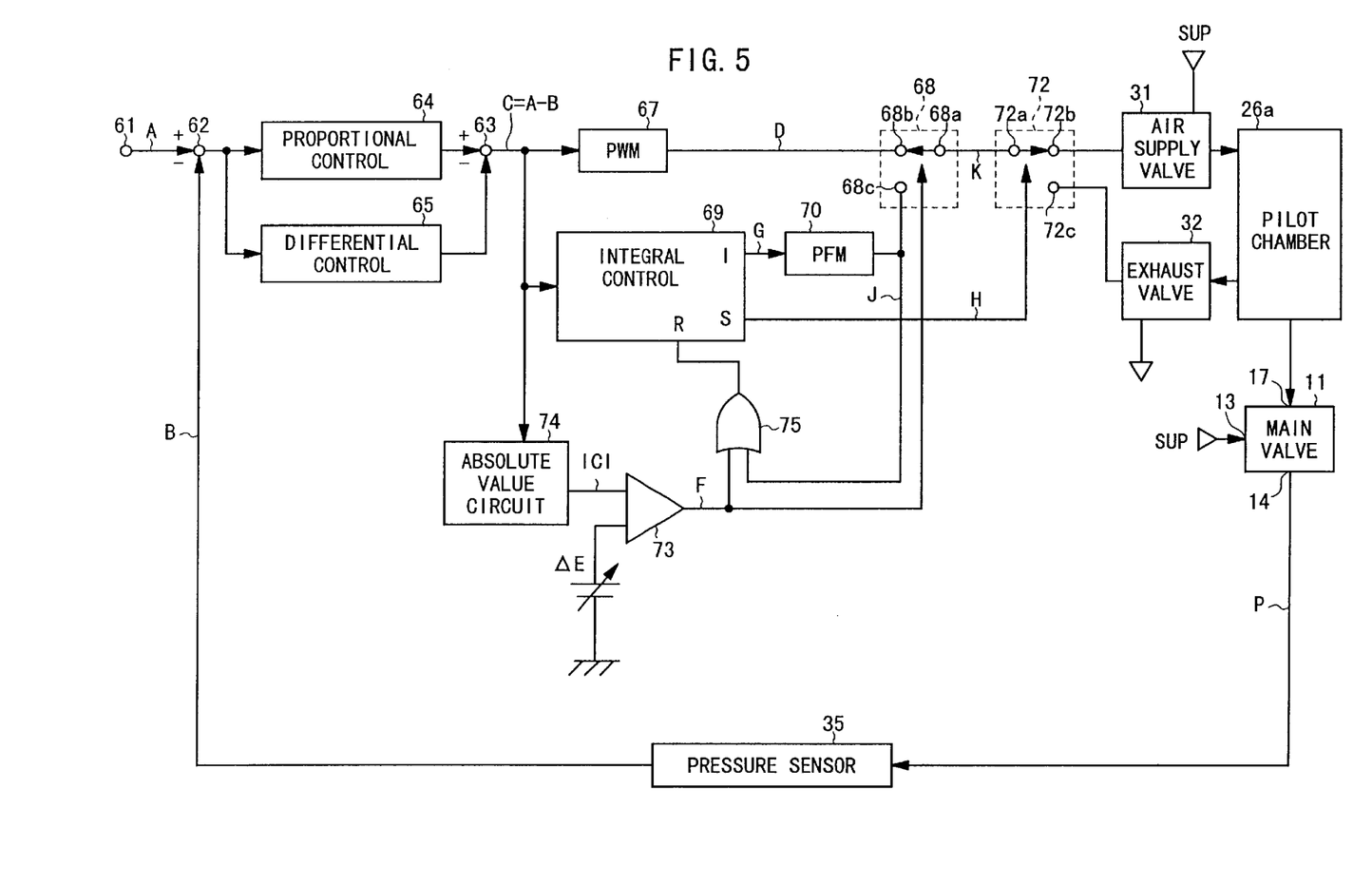
FIG. 5 is a diagram mainly showing the construction of a functional block of a main control unit.

FIG. 5 shows a construction of an electric circuit where a function of a software stored in the main control unit 33 is expressed in an equivalent manner. In this embodiment, such a function is a function when a predetermined pressure signal (or a predetermined valve signal) A is a signal which rises from zero to a positive fixed value Q (a predetermined pressure value).

For example, the predetermined pressure signal A corresponding to the predetermined pressure value Q set by the key entry device 44 is supplied as an addition input (or a positive input) from an input terminal 61 of FIG. 5 to a node (referred to as a subtracter since it works as a subtracter) 62 and a discharge pressure signal B is supplied to a subtraction input (or a negative input) of the node 62.

A difference signal between the predetermined pressure signal A and the discharge pressure signal B is supplied to a positive input of a node 63 by way of a well-known proportional control circuit 64 and is supplied to a negative input of the node 63 by way of a well-known differential control circuit 65. The proportional and differential controls performed by the proportional control circuit 64 and the differential control circuit 65 are employed in view of the fact that although the response becomes vibratory when only the proportional control is employed, the vibration can be attenuated when both the proportional and differential controls are employed and hence, the response can be stabilized. In this embodiment, for obviating the cumbersomeness, the output signal of the node 63 is considered to be the difference signal C (C=A−B) between the predetermined pressure signal A and the discharge pressure signal B.

This difference signal C is converted to a pulse-width modulation (PWM) signal D by way of a PWM (pulse-width modulation) circuit 67 and is supplied to one fixed terminal (or a fixed contact) 68b of a multiplexer 68 which constitutes switching means.

The difference signal C is supplied to an integral control circuit 69 and its integration signal G is converted to a pulse frequency modulation (PFM) signal J by way of a PFM (pulse frequency modulation) circuit 70 and is supplied to the other fixed terminal (or fixed contact) 68c. Here, the PFM signal J is supplied to the integral control circuit 69 as a reset signal by way of an OR circuit 75. A switching signal H is supplied to a switching control terminal of another multiplexer 72 from a terminal S of the integral control circuit 69.

The above-mentioned difference signal C is supplied to an absolute value circuit 74 and its difference absolute value signal |C| is supplied to one input terminal of a comparator 73. A reference signal ΔE is supplied to the other terminal of the comparator 73. The comparator 73 outputs an output signal F which works as a reset signal or a switching signal. Accordingly, the output signal F is also called as a reset signal or a switching signal. The output signal F is supplied to the integral control circuit 69 by way of the OR circuit 75 as a reset signal and further is supplied to a switching control terminal of the multiplexer 68 as the switching signal.

The PWM signal D or the PFM signal J is supplied to the air supply valve 31 by way of a common terminal (or a common contact) 68a of the multiplexer 68 and by way of a common terminal (or a common contact) 72a, a fixed terminal 72b of the multiplexer 72 as a drive signal K, while the PWM signal D or the PFM signal J is also supplied to the exhaust valve 32 by way of the common terminal 72a and a fixed terminal 72c.

Corresponding to the drive signal K supplied to the air supply valve 31, the open time of the air supply valve 31 is controlled and the pressurized fluid SUP is supplied to the pilot chamber 26a.

Under a condition that the exhaust valve 32 is closed and the air supply valve 31 is opened, the pressurized fluid is supplied to the pilot chamber 26a from the air supply valve 31 and in a condition that the air supply valve 31 is closed and the exhaust valve 32 is opened, the pressurized fluid in the pilot chamber 26a is discharged to atmosphere by way of the exhaust valve 32 and the exhaust port 21 (see FIG. 1).

In FIG. 5, the open control of the air supply valve body (also referred to as a main valve since it can be considered as the main valve 11) 17 is performed in response to the pressure of the pilot chamber 26a. The discharge pressure P of the discharge port 14 is converted as the pressure signal B which is an electric signal by means of the pressure sensor 35 and is fed back to the node 62 as a feedback signal.

Subsequently, the operations of the essential parts of the above-mentioned embodiment are explained also with reference to wave-form charts of FIG. 6. Here, the MPU performs the control.

Upon setting of the predetermined pressure value Q by the key entry device 44, in FIG. 6, as shown at a point of time t0, the predetermined signal A expressed by a step wave form (see the wave form shown by a dotted line in FIG. 6A) rises from a zero level to Q (A=Q) of a high level. In this case, the reference signal ΔE set by the comparator 73 is set to be several percents of the predetermined pressure value Q.

At this point of time t0, since the value of the pressure detection signal B (see a wave form expressed by a solid line in FIG. 6A) which is the output signal of the pressure sensor 35 is zero value and hence, the difference signal C takes the maximum value. Since the absolute value signal |C| is also greater than the level of the reference signal ΔE, the output signal F (see FIG. 6C) is at a low level and during the period that the output signal F is at the low level, the multiplexer 68 has the common contact thereof 68a held in a condition shown in FIG. 5 where the common contact 68a is connected to the fixed contact 68b of the PWM circuit 67 side. Furthermore, the switching signal H outputted from the integral control circuit 69 (see FIG. 6E) is held at the low level until the integration signal G (see FIG. 6D) exceeds a positive threshold Th. During the period that the switching signal H is held at the low level, the common terminal 72a of the multiplexer 72 is connected to the fixed terminal 72b of the air supply valve 31 side.

Accordingly, at the point of time t0, against the predetermined pressure value Q, the difference signal C has its maximum value thereof set to C=Q and hence, the PWM circuit 67 is driven at a maximum duty factor, namely, at a full duty and the air supply valve 31 (see also FIG. 1) is opened and the pressurized fluid SUP is supplied to the first diaphragm chamber 26a from the supply port 13 by way of the air supply valve 31. Accordingly, the stem 19 is moved downwardly along with the downward movement of the diaphragm 25, and the air supply valve body 17, namely, the main valve 11 is opened. Accordingly, the pressurized fluid SUP is supplied to the discharge port 14 from the supply port 13.

Figure 6A:
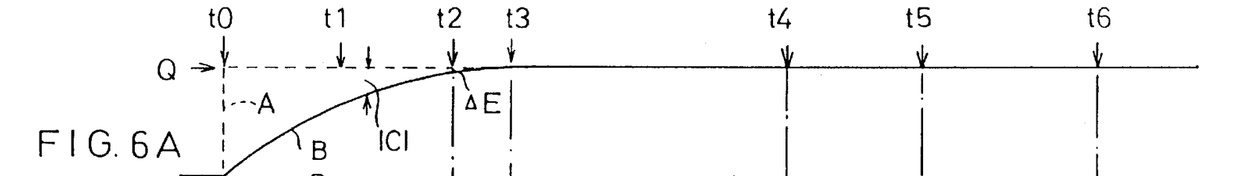
FIG. 6A shows a predetermined value signal and a pressure detection signal.
Figure 6B:
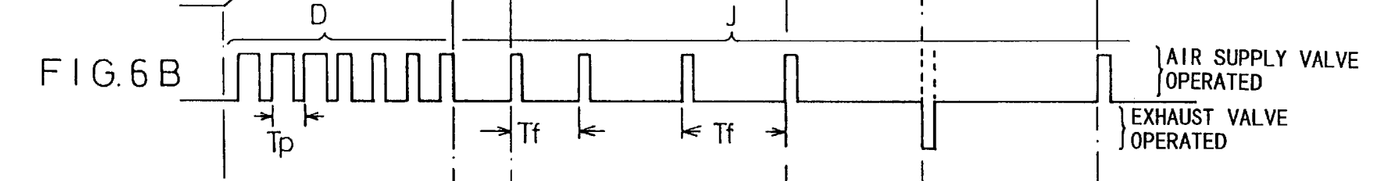
FIG. 6B shows a PWM signal and a PFM signal.

After a lapse of the point of time t0, the discharge pressure P is gradually increased and, as shown in FIG. 6A, the pressure detection signal B of the pressure sensor 35 is gradually increased in proportion to the discharge pressure P and the difference signal C is gradually decreased so that the duty factor of the PWM signal D (see FIG. 6B) of the PWM circuit 67 is gradually decreased. After the vicinity of the point of time t1, as the value of the difference signal C becomes smaller than a given value, the duty factor of the PWM signal D which is the output signal of the PWM circuit 67 takes the minimum value.

Figure 6C:
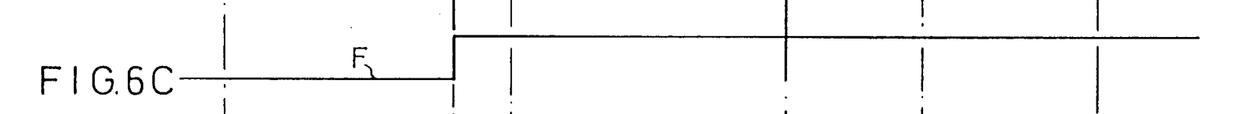
FIG. 6C shows a switching signal of a multiplexer.
Figure 6D:
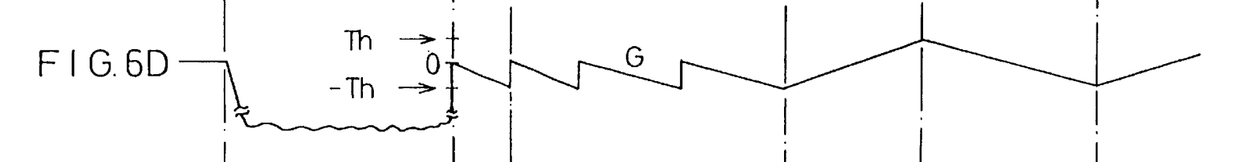
FIG. 6D shows an integral signal.
Figure 6E:
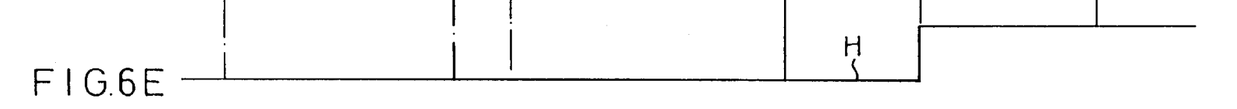
FIG. 6E shows a wave-form chart of the switching signal of the multiplexer.

At the point of time t2 where the absolute value signal |C| becomes smaller than the level of the reference signal ΔE, the comparator 73 is inverted and the output signal F is inverted from the low level to the high level (see FIG. 6C). Accordingly, the common contact 68a of the multiplexer 68 is switched to the fixed contact 68c of the PFM circuit 70 side and the integral control circuit 69 is reset to make the integration signal G take zero value and the integral action corresponding to the difference signal C starts from zero value. At the point of time t2, the PWM control is switched to the PFM control. The polarity of the integration signal G which is the output signal of the integral control circuit 69 is set to a negative polarity.

When the integration signal G reaches the negative threshold −Th, the PFM signal J (see FIG. 6B) which is an ON signal of a constant pulse-width is outputted from the PFM circuit 70 and this signal is supplied to the air supply valve 31 as a drive signal K, wherein ON period of the ON signal is a period corresponding to the minimum duty factor of the PWM signal D, for example.

At a point of time t3, the value of the pressure detection signal B becomes approximately equal to the predetermined pressure value Q. At this point of time t3, the air supply valve 31 is driven by the PFM signal J which is operated with a period Tf longer than a fixed period Tp of the PMD signal D and hence, the discharge pressure P, namely, the pressure detection signal B enables a so-called soft landing thereof relative to the predetermined pressure value Q and the generation of an amount of excess or an overshoot can be minimized or substantially eliminated.

When the PFM signal J is output at the point of time t3, the integral control circuit 69 is reset by this PFM signal J and the integral operation newly starts from the zero value.

In case the discharge pressure P is changed in a direction of increase by some causes after the integral control circuit 69 is reset at a point of time t4, the inclination of the integral signal G takes a positive inclination and when the integral signal G exceeds the threshold Th at a point of time t5, the switching signal H (see FIG. 6E) is inverted from the low level to the high level. Accordingly, the multiplexer 72 is connected to the exhaust valve 32 side and the PFM signal J shown in a dotted line is supplied to the exhaust valve 32 side.

Here, the exhaust valve 32 is opened only during a period that the PFM signal J is generated and the pilot chamber (the first diaphragm chamber) 26a is communicated with atmosphere by way of the exhaust port 21. Upon upward movement of the stem 19 caused by this action, the exhaust valve body 23 is released during a period which corresponds to the period that the PFM signal J is generated and hence, the discharge pressure P of the discharge port 14 is decreased. At a point of time t6, the air supply valve 31 is opened again.

In this manner, even after the point of time t3 where the pressure detection signal B, namely, the discharge pressure P reaches the predetermined pressure value Q, the air supply valve 31 and the exhaust valve 32 are controlled by the PFM signal J having the period (frequency) Tf (see FIG. 6B) which is longer than the period Tp of the PWM control and is controlled corresponding to the integration signal (integral value) G of the difference signal (pressure difference) C. Accordingly, it is possible to hold the discharge pressure P of the pneumatic regulator 10 at a stable pressure value with least pulsation.

In this case, when the period that external pneumatic apparatus which is connected to the discharge port 14 is operated at the constant or fixed discharge pressure P Is long, in the PFM control region (period), the open frequency (the operation frequency) of the air supply valve 31 and the exhaust valve 32 which are solenoid valves can be decreased and hence, compared to a conventional control which depends exclusively on the PWM control, an advantage can be also achieved such that the consumption of the pressurized fluid SUP for controlling the pilot chamber 26a can be reduced.

Of course, as shown in FIG. 2, using the pressure switch output function 51, it can be functioned as a pressure switch. For example, in case the discharge pressure P is abnormal due to a lack of supply pressure, namely, in case the discharge pressure P does not reach the predetermined pressure value Q or the discharge pressure P cannot be elevated, this abnormal condition of the discharge pressure P is detected from outside.

Furthermore, in case the discharge pressure P is displayed on the LED display 43, it is unnecessary to install a pressure gage outside and its piping and wiring become unnecessary.

Still furthermore, even in a condition that the pressurized fluid SUP is not applied, for example, using the key entry device 44 and the LED display 43, the predetermined pressure can be set as a digital value and can be displayed.

It is also possible to control the predetermined pressure at multiple stages by a remote control using the analogue input function 48 or the digital input function 49.

It is needless to say that the present invention is not limited to the above-mentioned embodiment and various constructions are conceivable without departing from the gist of the present invention.

INDUSTRIAL APPLICABILITY

As has been explained heretofore, according to the present invention, the advantage can be obtained such that in case the discharge pressure value of the pneumatic regulator is small relative to the predetermined pressure value (the difference between the predetermined pressure value and the discharge pressure value being large), the solenoid valve is operated by the pulse-width modulation signal and hence, the rapidity of the input and output response (the variation characteristics of the discharge pressure value relative to the predetermined pressure value) can be held, while in case the discharge pressure value is close to the predetermined pressure value, the solenoid valve is driven by the pulse frequency modulation signal and hence, the amount of excess or the overshoot is decreased and the fluctuation of the discharge pressure value which has reached the predetermined pressure value, namely, a so-called ripple can be decreased.

In short, according to the pneumatic regulator of the present invention, the advantage is achieved such that the pressure and the flow rate of the fluid discharged from the main valve can be accurately regulated.

What is claimed is:

1. A pneumatic regulator which regulates a discharge pressure value discharged from a main valve to a predetermined pressure value by increasing or decreasing a pilot pressure in response to a gas supplied to or discharged from a solenoid valve, wherein said discharge pressure value is detected, and in case a pressure difference between said discharge pressure value and said predetermined pressure value is greater than a given value, said solenoid valve is driven by a pulse-width modulation signal, while in case said pressure difference is smaller than said given value, said solenoid valve is driven by a pulse frequency modulation signal.

2. A pneumatic regulator according to claim 1, wherein said given value is variable.

3. A pneumatic regulator according to claim 1, wherein said given value is set to several percent of said predetermined pressure value.

4. A pneumatic regulator according to claim 1, wherein in generating said pulse-width modulation signal or said pulse frequency modulation signal, said signal is generated based on a proportional and differential control signal of said pressure difference between said discharge pressure value and said predetermined pressure value.

5. A pneumatic regulator which regulates a discharge pressure value discharged from a main valve to a predetermined pressure value by increasing or decreasing a pilot pressure in response to a gas supplied to or discharged from a solenoid valve, wherein:

said discharge pressure value is detected and a pressure difference between said discharge pressure value and said predetermined pressure value is supplied to a pulse-width modulation circuit, an integral control circuit and an absolute value circuit;

an output of said integral control circuit is supplied to a pulse frequency modulation circuit;

an output of said absolute value circuit is supplied to one input of a comparator;

a reference signal is supplied to another input of said comparator as a given value; and said integral control circuit is reset by an output of said comparator or an output of said pulse frequency modulation circuit, and along with said resetting, an output of said pulse frequency modulation circuit and an output of said pulse-width modulation circuit are switched over by an output of said comparator and is supplied to said solenoid valve, in case said pressure difference is greater than said given value, a switching is performed based on an output of said comparator so as to make said pulse-width modulation circuit connected with said solenoid valve and said solenoid valve is driven by a pulse-width modulation signal, in case said pressure difference is smaller than said given value, based on an output of said comparator, said integral control circuit is reset and an integral action is started and a switching is performed so as to make said frequency modulation circuit connected with said solenoid valve, and when said integral value reaches a fixed threshold, a pulse frequency modulation signal having a fixed pulse-width is outputted from said pulse frequency modulation circuit and said solenoid is driven, and said integral control circuit is reset to start an integral action again.

6. A pneumatic regulator according to claim 5, wherein said given value is variable.

7. A pneumatic regulator according to claim 5, wherein said given value is set to several percent of said predetermined pressure value.

8. A pneumatic regulator according to claim 5, wherein in generating said pulse-width modulation signal or said pulse frequency modulation signal, said signal is generated based on a proportional and differential control signal of said pressure difference between said discharge pressure value and said predetermined pressure value.

9. A pneumatic regulator comprising:

a main valve having a supply port, a discharge port and an exhaust port, wherein a stem which is displaced along an axial direction under a deflecting action of a diaphragm stretched inside is disposed at a central portion of said main valve and said main valve further includes a valve body which is opened or closed under a displacement action of said stem, and a bonnet integrally connected with an upper portion of said main valve and having a space portion, wherein in said space portion of said bonnet, a first solenoid valve and a second solenoid valve which control a pilot pressure supplied to a diaphragm chamber defined by said diaphragm, a pressure detection part which detects a discharge pressure value discharged from said discharge port, a control part which outputs a drive signal to said first solenoid valve and said second solenoid valve based on a discharge pressure signal transmitted from said pressure detection part, and a display part which displays at least a pressure value corresponding to a discharge pressure signal detected by said pressure detection part are disposed, further wherein with respect to said drive signal, in a case of a pressure difference between said discharge pressure value and a predetermined pressure value being greater than a given value, said first solenoid valve and said second solenoid valve are driven by a pulse width modulation signal, while in a case of said pressure difference being smaller than said given value, said first solenoid valve and said second solenoid valve are driven by a pulse frequency modulation signal.

10. A pneumatic regulator according to claim 9, further comprises an opening portion formed in an upper surface of said bonnet, a connector which electrically connects a control part disposed inside of said bonnet with an input and output interface disposed outside of said bonnet.

11. A pneumatic regulator according to claim 9, wherein a valve body includes an exhaust valve body which is moved away from an exhaust opening against a compression force of a spring member for making a discharge port communicate with an exhaust port, and said exhaust valve body is integrally displaced with a retainer ring engaged with an outer peripheral portion of said stem so that said exhaust valve body is moved away from said exhaust opening.

12. A pneumatic regulator according to claim 9, wherein said control part includes a microprocessor unit, a signal conversion part which converts a discharge pressure signal transmitted from said pressure detection part to a digital signal, and an air supply valve control unit and an exhaust valve control unit which respectively drive and control said first solenoid valve and said second solenoid valve based on a control signal transmitted from said microprocessor unit.

* * * * *